3,333,791
FLAP ACTUATOR
Alberto Alvarez-Calderon, Av. Salaverry 3465,
Orrantia del Mar, Lima, Peru
Filed Dec. 9, 1965, Ser. No. 512,719
18 Claims. (Cl. 244—42)

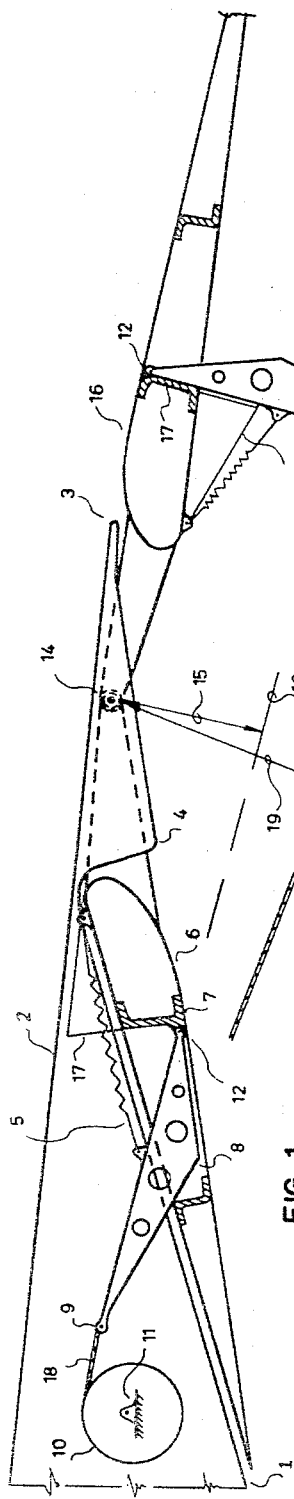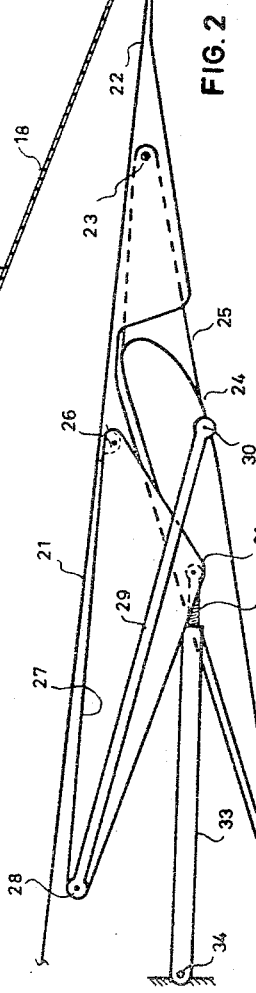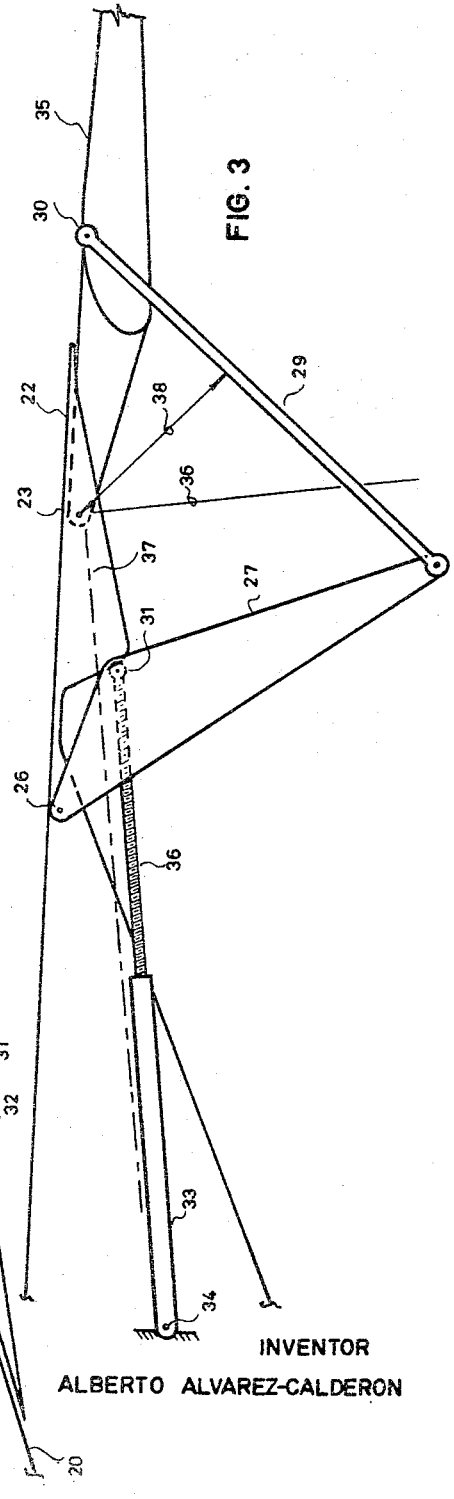

This application is a continuation-in-part of my copending patent application 471,274 of July 12, 1965, and it relates to my issued U.S. Patent 3,126,173. This invention relates to trailing edge flaps for aircraft.

The aerodynamic, structural, mechanical and operational characteristics of inverting flaps are described in the above-mentioned application, and patent; they will not be repeated here.

It should be mentioned that the structures and mechanism shown in this application are not only applicable to slotted inverting flaps of the type described in the cited patent and patent application, but also to unslotted inverting trailing edge flaps, since the invention shown herein does not depend mechanically or structurally in the existence of the slot.

One purpose of this invention is to provide simple mechanical means to provide angular motion of my trailing edge flaps by an angle greater than 90° and of the order of 160°.

Another purpose of this invention is to provide this motion with a simplified cable-and-link system which has large moment arms to operate the trailing edge flap.

Another purpose of the invention is to provide a bellcrank-link system to produce trailing edge flap motion in an irreversible way as explained later.

These and other objects of my invention are described in the specification, and in the drawings, in which FIG. 1 shows a cable-link retraction system for my trailing edge flap.

FIG. 2 shows a bellcrank-link-push rod system for my flap in the retracted position.

FIG. 3 shows a bellcrank-link-push rod system for my flap in the extended position.

FIG. 1 shows a wing 1 having an upper surface 2, a trailing edge 3, and a recession 5, in its lower surface ahead of a downwardly protruding lip 4 in the lower surface of the wing. A flap is shown inverted retracted in position 6.

The retraction system comprises a link member 8 pivotally connected at axis 12 to main flap spar 7, and pin-jointed at 9 to cable 18 which winds on drum 10. The drum is supported at axis 11 on the wing. Evidently the line of action link 8 and cable 13 in retracted flap position 6 is shown as 13 which passes well below flap hinge axis 14 and therefore has a large moment arm 15 to close flap 6 tightly against recession 5.

To open the flap, drum 10 is rotated clockwise and under the action of gravity and airloads, or of a spring (not shown) at hinge axis 14 if desired, the flap is opened counterclockwise to extended position 16. It is seen that link 8 is now resting against triangular fixed support 17, no longer colinear with the cable 13 but approximately at right angles both to the flap and the cable. Therefore the line of action of cable 18 is at a large distance 19 below axis 14 and the cable loads are small.

The efficiency and elegance of the system permits virtually any choice of distances 19 and 15 for efficient leverage, yet it hardly occupies any space within the wing when the flap is retracted since link 8 can change orientation when the flap is retracted.

Other intermediate positions for the flap, as for example 90° flap deflection, are not shown as they are evident by inspection to those skilled in the art.

FIGS. 2 and 3 show another retraction system for inverting trailing edge flaps of the type shown, but also applicable to similarly hinged flaps without slots. FIGS. 2 and 3 differ from the previous one in that the flap actuator shown is irreversible, that is, for any position of the push rod, there is only one position of the flap, and the flap need not use either airloads or spring loads for operation.

The systems of FIGS. 1 and 2, however, are very similar in that the airloads generate tension loads to the actuator during the retraction and extension cycles.

The system of FIGS. 2 and 3 shows a combination jackscrew-bellcrank-link system which has an advantage of adequate leverage which cannot be provided by a jackscrew alone.

Specifically FIG. 2 shows a wing 20 with an upper surface 21, a trailing edge 22 and a flap hinge axis 23. A trailing edge flap is shown retracted up-side down at 24 and supported by ear bracket 25 to axis 23. The retraction system comprises a bellcrank 27 pivotally supported at axis 26 to the wing and connected to actuator jackscrew or push rod 33-32 at hinge axis 31. The bellcrank commands flap motion by means of link 29 hinged at hinge axis 28. Link 29 is pivotally hinged to flap at hinge axis 30. Push rod 33-32 is pivotally hinged to wing at hinge axis 34. Therefore the design avoids sliding motions everywhere, and this is a great advantage.

For flap extension the pilot, through suitable means, which can be defined by anyone skilled in the art for a particular flap installation, commands axial extensions of shaft 32 from within 33, for example, by means of a jackscrew system driven by an electric motor, or by hydraulic power. Upon axial extension of 32-33, the bellcrank must rotate counterclockwise about axis 26 and therefore link 29 must command the flap to rotate counterclockwise about axis 23. Full extension of actuator 32-33 causes full extension of flap to position 35 shown in FIG. 3.

In FIG. 3 there can be seen the relative disposition of the elements of the retraction system: it is seen that link 29 has adequate leverage 38 with reference to axis 23 and it extends ahead of position 36 which is perpendicular to chordline 37 and through hinge axis 23.

Bellcrank 27 is seen restrained in angular motion by the actuator 32-33. Therefore the entire system is rigid. The system has the advantage of being irreversible, as explained earlier. It amplifies the angular motion of bellcrank 27 to a larger angular motion of the flap, and it requires only a relatively short travel of element 32 for the large displacement of the flap. However, loads for the actuator are high. Fortunately the components of the retraction system are loaded principally in tension, and therefore the actuator components can be long and slender and light. This would not be the case if compression loads were present, and is possible because air loads are always tending to open flap downstream (counterclockwise in the figure).

The actuator illustrated shows specific proportions between bellcrank and flap size, and of travel of actuator and relative position of hinge lines. These have been designed for thin wing applications. In thicker wings, axis 26 should preferably be at a higher elevation, and even in thin wings this axis can be raised if necessary above the upper surface of the wing by means of a faired protrusion for instance that shown in my Fig. 7 of my U.S. Patent 3,126,173.

In FIG. 2, for example, the size of the bellcrank or plate 27, and length of link or rod 29 are no longer than the chord of the flap, but greater than half of the chord of the flap. Hinge axis 26 is approximately equidistant to axis 23 and axis 31, but closer to 31; and 31 is near the wing's lower surface whereas 26 is close to the wing's upper surface.

In FIG. 3 axis 31 is well below, but ahead, of axis 23, and the angle between 27 and 29 is of the order of 90 degrees, and that between 29 and 35 is of the order of 45 degrees. Naturally, these angles vary in the intermediate flap positions.

As an embodiment to my invention, bellcrank 27 can be mounted approximately parallel to the plane of the wing when in retracted position, with axis 26 at a large angle of incidence to the wing's surface 21, and with end 28 restricted by a suitable rail to travel on a fixed path. Joints 28 and 30 may be universal joints, an angle of incidence of axis 26 should be inclined to produce downward displacement of joint 28 well below the wing when the actuator is extended. Such an installation would have specific advantages in allowing more room in the thin wing for the flap and for a large bellcrank.

Evidently, many variations can be made without departing from the spirit of my invention.

What I claim is:

1. A wing with a trailing edge; a flap mounted on said wing adjacent to said trailing edge with an approximately spanwise articulation, and adapted to be rotated about said articulation between a retracted position contiguous to said wing and ahead of said articulation and an extended position to the rear of said articulation in which it increases the area of said wing; and means to move said flap from said retracted position to said extended position comprising: link means connected at one end to said flap external to said articulation and at another end to cable means; means adapted to withdraw and pay out said cable means; means restricting the angular motion of said link means between a position approximately inclined at a shallow angle to said flap to a position inclined at a large angle to said flap.

2. The structure of claim 1 further characterized in that when said flap is in said retracted position the line of action of said cable and link means passes well below said articulation and said link member is at said shallow angle with respect to said flap, and in that when said flap is in an extended position said link means are inclined at a large angle to said cable and to said flap, and the line of action of said cable means passes well below said articulation.

3. A primary airfoil surface having a trailing edge portion; an auxiliary surface mounted for movement on said primary surface at a first articulation adjacent said trailing edge portion, said auxiliary surface being adapted to be inverted between a retracted high speed position faired with said trailing edge portion and an extended position trailing said primary airfoil and increasing the chord of said primary airfoil; positioning means for defining the position of said auxiliary surface in said retracted and extended position including: link means mounted on said auxiliary surface for movement relative to said auxiliary surface at a second articulation adjacent to one extremity of said link means; connecting means extending between said link means and said primary airfoil from a third articulation on said link means eccentric and away from said second articulation to a connection on said primary airfoil; said positioning means being characterized in that, when said auxiliary surface is in said extended position, said link means are oriented at a large angle to said auxiliary surface protruding below said auxiliary surface, with said third articulation being located well below said auxiliary surface, and with a principal portion of said connecting means being located below the elevation of said auxiliary surface; and in that, when said auxiliary surface is in said retracted position, said link means are oriented at an angle relative to said auxiliary surface different from said large angle and above said auxiliary surface, with a principal portion of said connecting means being located above the elevation of said auxiliary surface.

4. The structure of claim 3 further characterized in that said connecting means comprise cable means adapted to be paid out away from said primary airfoil to extend said auxiliary surface, and adapted to be withdrawn toward said primary airfoil to retract said auxiliary surface.

5. The structure of claim 4 further characterized in that said first articulation is located adjacent to the downwardly facing side of said auxiliary surface in said retracted position whereby the retracting leverage of said cable means is increased in said retracted position.

6. The structure of claim 3 further characterized in that, when said auxiliary surface is in said extended position, said link means is restrained from forward motion by contact of said link means and stopping means on said auxiliary surface located below said second articulation and upstream of said link means, said link means being oriented at a large angle to the line of action of said cable means.

7. The structure of claim 6 further characterized in that, when said auxiliary surface is in said retracted position, said stopping means is located in a direction downstream and out of contact with said link means and above said second articulation.

8. The structure of claim 7 further characterized in that lines between said connection, said third articulation, and said first articulation define triangles for any deflection of said auxiliary surface.

9. The structure of claim 7 being further characterized in that a line of action of said cable means in said extended and retracted position passes well below said first articulation; and in that the angle between said link means and said auxiliary surface in said extended position is greater than the angle between said primary airfoil and said auxiliary surface in said extended position.

10. The structure of claim 3 being further characterized in that said connecting means includes a rigid element hinged on said primary airfoil and connected to said third articulation; said rigid element being adapted to move in a downstream direction to displace said auxiliary surface from said retracted position to said extended position.

11. The structure of claim 10 being further characterized in that axially extending means are provided between said rigid element and said primary airfoil which, when extending, move said rigid element downstream and extend said auxiliary surface.

12. The structure of claim 10 further characterized in that said axially extending means, together with straight lines extending between the said hinge of the said rigid element and opposite extremes of said axially extending means, define a triangle for all auxiliary surface deflections.

13. The structure of claim 10 further characterized in that lines connecting said first, second, and third articulations define a separate triangle for all auxiliary surface deflections.

14. The structure of claim 12 further characterized in that lines connecting said first, second and third articulations define a separate triangle for auxiliary surface deflections.

15. The structure of claim 10 further characterized in that said hinge of said rigid element is located adjacent the upper surface of said primary airfoil at a position above the location of said retracted auxiliary surface.

16. The structure of claim 10 further characterized in that in said retracted position said connecting means are located within the outward contours of said primary airfoil and said retracted auxiliary surface.

17. The structure of claim 11 further characterized in that said axially extending means comprise a threaded member adapted to be mated to a grooved member, the length of said extending means being determined irreversibly by relative rotation of said threaded and grooved members.

18. The structure of claim 11 further characterized in that said rigid element is a bellcrank, with said axially extending means connected to said bellcrank at a pivot located between said hinge of said bellcrank and said third articulation; and in that, when said auxiliary surface is moved from said retracted to said extended position, the total displacement in a chordwise plane of said pivot is less than the total displacement in said chordwise plane of said third articulation.

References Cited

UNITED STATES PATENTS

| | | | |
|---|---|---|---|
| 1,893,065 | 1/1933 | Zaparka | 244—42 |
| 2,156,403 | 5/1939 | Riviere | 244—42 |
| 2,609,167 | 9/1952 | Gero | 244—42 X |
| 3,041,014 | 6/1962 | Gerin | 244—42 |
| 3,126,173 | 3/1964 | Calderon | 244—42 |

MILTON BUCHLER, *Primary Examiner.*

FERGUR S. MIDDLETON, *Examiner.*

B. BELKIN, *Assistant Examiner.*